United States Patent
Hsu et al.

(10) Patent No.: US 7,013,217 B2
(45) Date of Patent: Mar. 14, 2006

(54) SYSTEM AND METHOD FOR DETERMINING FORMATION SLOWNESS

(75) Inventors: Kai Hsu, Sugar Land, TX (US); Dominique Dion, Suplaisir (FR)

(73) Assignee: Schlumberger Technology Corporation, Sugar Land, TX (US)

(*) Notice: Subject to any disclaimer, the term of this patent is extended or adjusted under 35 U.S.C. 154(b) by 179 days.

(21) Appl. No.: 10/604,034

(22) Filed: Jun. 23, 2003

(65) Prior Publication Data

US 2004/0006428 A1    Jan. 8, 2004

Related U.S. Application Data

(63) Continuation-in-part of application No. 09/688,437, filed on Oct. 16, 2000, now abandoned.

(51) Int. Cl.
*G01V 1/40* (2006.01)
*G01V 1/00* (2006.01)

(52) U.S. Cl. .................................. 702/11; 367/29
(58) Field of Classification Search ................ 702/11, 702/18; 367/25, 29, 45
See application file for complete search history.

(56) References Cited

U.S. PATENT DOCUMENTS

| | | | |
|---|---|---|---|
| 3,597,727 A | 8/1971 | Judson et al. | |
| 4,543,648 A * | 9/1985 | Hsu | 367/29 |
| 4,594,691 A | 6/1986 | Kimball et al. | |
| 4,698,793 A * | 10/1987 | Wu | 367/32 |
| 4,819,214 A | 4/1989 | Gutowski et al. | |
| 5,392,213 A | 2/1995 | Houston et al. | |
| 5,510,582 A | 4/1996 | Birchak et al. | |
| 5,594,706 A * | 1/1997 | Shenoy et al. | 367/76 |
| 5,852,587 A | 12/1998 | Kostek et al. | |
| 5,971,095 A * | 10/1999 | Ozbek | 181/112 |
| 6,026,913 A | 2/2000 | Mandal et al. | |
| 6,082,484 A | 7/2000 | Molz et al. | |
| 6,459,993 B1 * | 10/2002 | Valero et al. | 702/14 |
| 6,477,112 B1 * | 11/2002 | Tang et al. | 367/38 |
| 6,654,688 B1 * | 11/2003 | Brie et al. | 702/2 |
| 6,748,329 B1 * | 6/2004 | Mandal | 702/14 |

FOREIGN PATENT DOCUMENTS

WO    WO 98/48508    10/1998

* cited by examiner

*Primary Examiner*—Michael Nghiem
*Assistant Examiner*—Toan M. Le
(74) *Attorney, Agent, or Firm*—Victor H. Segura; Dale V. Gaudier

(57) ABSTRACT

The invention provides techniques for calculating velocity from sonic signals with an improved signal to noise ratio, accuracy and certainty of result. Multichannel coherence measures are calculated from sonic transmitter signals and averaged to produce an average coherence measure. The formation slowness is determined from the averaged coherence measure.

12 Claims, 7 Drawing Sheets

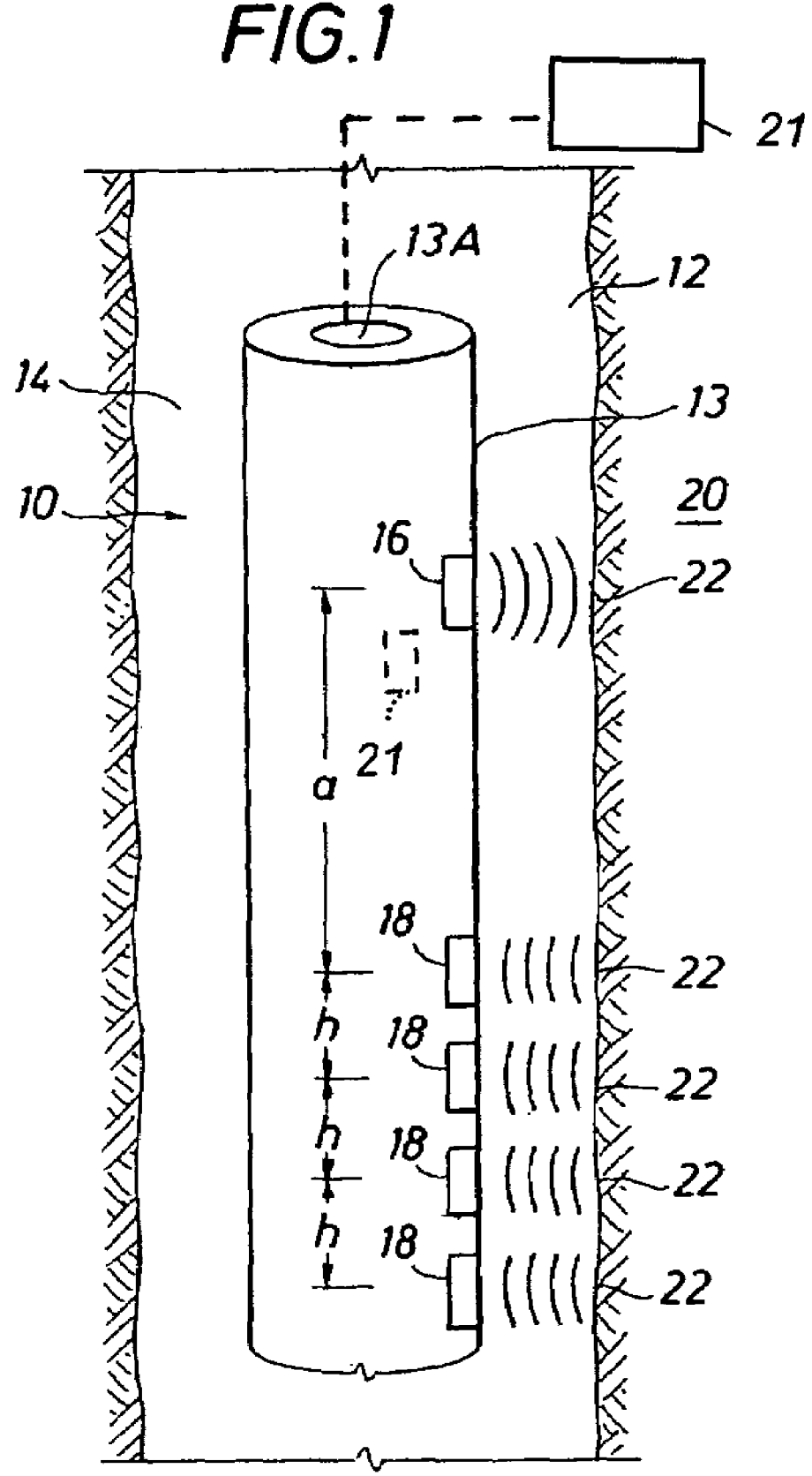

SYSTEM AND METHOD FOR DETERMINING FORMATION SLOWNESS

CROSS REFERENCE TO RELATED APPLICATIONS

This present application is a continuation-in-part of U.S. application Ser. No. 09/688,437 filed on Oct. 16, 2000 now abandoned.

BACKGROUND OF INVENTION

The invention is related to sonic logging of earth formations. More specifically, the invention is related to methods for processing sonic logging instrument signals to improve the quality of estimation of certain formation properties.

DESCRIPTION OF RELATED ART

In the oil and gas industry, subsurface formations are typically probed by well logging tools to determine formation characteristics which can be used to predict or assess the profitability and producibility of subsequent drilling or production operations. In many cases, acoustic logging tools are used to measure formation acoustic properties which may be used to produce images or derive related characteristics for the formations.

Acoustic waves are periodic vibrational disturbances resulting from acoustic energy which propagates through a medium, such as the subsurface formation. Acoustic waves are typically characterized in terms of their frequency, amplitude, and speed of propagation. Acoustic properties of interest for formations may include compressional wave speed, shear wave speed, borehole modes, and formation slowness. Additionally, acoustic images may be used to depict borehole wall conditions and other geological features away from the borehole. These acoustic measurements have applications in seismic correlation, petrophysics, rock mechanics and other areas.

Recordings of acoustic properties as functions of depth are known as acoustic logs. Information obtained from acoustic logs may be useful in a variety of applications, including well to well correlation, determining porosity, determining mechanical or elastic parameters of rock to give an indication of lithology, detecting over-pressured formation zones, and enabling the conversion of a seismic time trace to a depth trace based on the measured speed of sound in the formation.

Sonic logging of earth formations entails lowering an acoustic logging instrument into a wellbore traversing the formations. The instrument typically includes one or more acoustic sources (i.e., a transmitter) for emitting acoustical energy into subsurface formations and one or more acoustic receivers for receiving acoustic energy. The transmitter is periodically actuated to emit pulses of acoustic energy into the wellbore, which travel through the wellbore and into the formation. After propagating through the wellbore and formation, some of the acoustic energy travels to the receivers, where it is detected. Various attributes of the detected acoustic energy are subsequently related to subsurface or tool properties of interest.

FIG. 1 shows a conventional sonic logging instrument. The instrument 10 is shown disposed in a wellbore 12 traversing an earth formation 20. The wellbore 12 is typically filled with a drilling fluid 14 (also called "mud") that is used during the drilling of the wellbore. The instrument 10 is generally implemented in a tubular 13 support, which in the case of a drilling tool includes a passage 13A through its center for pumping the drilling fluid 14 to a mud motor (not shown) and/or a drill bit (not shown) at the bottom of a drill string (not shown). The logging instrument 10 includes one or more acoustic transmitters 16 and a plurality of acoustic receivers 18 disposed in the tubular 13. The receivers 18 are shown spaced apart from each other, along the longitudinal axis of the instrument 10, at a selected distance h. One of the receivers 18 closest to the transmitter 16 is axially spaced therefrom by a selected distance a. It will be appreciated by those skilled in the art that even though the instrument shown in FIG. 1 has the same distance h between each of the receivers, the distance between each receiver is variable. The instrument 10 also houses one or more conventional computer modules 21 including processors, memory, and software to process waveform signal data as known in the art. As also known in the art, the computer module(s) 21 can be disposed within the instrument, at the earth surface, or combined between the two as shown in FIG. 1. Conventional sonic logging instruments are further described in U.S. Pat. Nos. 5,852,587, 4,543,648, 5,510,582, 4,594,691, 5,594,706 and 6,082,484.

In operation, the instrument transmitter 16 is periodically actuated or "fired", sending pulses of acoustic energy, shown generally at 22, into the drilling fluid 14 where they travel through the wellbore 12, and are eventually detected by the receivers 18. Depending on the axial spacings a and h, on the types of transmitter and receivers used, and on the acoustic characteristics of the particular earth formations penetrated by the wellbore adjacent the instrument 10, the receivers 18 will generate electrical signals in response to the acoustic energy which have particular waveforms. Examples of such waveforms are shown in FIG. 2A at 30, 32, 34, and 36. Typically each waveform 30, 32, 34, and 36 will include a relatively high amplitude event 30A, 32A, 34A, 36A, respectively, which corresponds to the arrival from the earth formation of the energy which was emitted from the transmitter 16 and has passed along the wellbore wall. The time at which each high amplitude event 30A, 32A, 34A, 36A actually occurs in each waveform depends on the axial spacing of the particular receiver, the acoustic properties (particularly acoustic velocity) of the particular earth formations between the transmitter and receivers, and on the lateral and angular position of the instrument in the wellbore. Similarly, examples of waveforms made by successive firings of the transmitter 16 are shown in FIG. 2B at 38, 40, 42 and 44; in FIG. 2C at 46, 48, 50 and 52; and in FIG. 2D at 54, 56, 58 and 60.

Processing techniques known in the art for determining compressional and/or shear velocity include correlation of the acoustic energy waveforms detected at the receivers. The correlation is performed using various values of slowness (inverse of velocity) until a degree of coherence between all the waveforms reaches a maximum. The value of slowness (or velocity) at which the degree of coherence is determined to be at a maximum is selected as the slowness or velocity for the formation interval in which the receivers are disposed at the time the transmitter is actuated.

The certainty or accuracy of the velocity determination using correlation techniques can be improved by summing the waveforms (also know as "stacking") detected at the receivers for a selected number of transmitter actuations, such as shown in FIGS. 2A through 2D, and determining the slowness time coherence (STC) from the stacked waveforms. In STC processing, the measured signal is typically time window "filtered" and stacked, and a semblance function is computed. The semblance function relates the presence or absence of an arrival with a particular slowness and particular arrival time. If the assumed slowness and arrival time do not coincide with that of the measured arrival, the semblance takes on a smaller value. Consequently arrivals in the received waveforms manifest themselves as local peaks in a plot of semblance versus slowness and arrival time. These peaks are typically found in a peak-finding routine. Coherence techniques such as STC or semblance-based calculations are further described in U.S. Pat. Nos. 4,543,648, 4,594,691, and 5,594,706 (all incorporated herein by reference).

It should be noted that the example waveforms of FIGS. 2A through 2D are simulated compressional waveforms for an earth formation having a compressional interval velocity of 100 microseconds per foot (328 microseconds/meter). Random noise has been added to each simulated waveform. The actual waveforms of the detected acoustic energy, the arrival times and the noise type will of course depend on formation and instrument factors.

Conventional waveform correlation techniques have been useful in cases where the logging instrument is moved slowly or is small compared to the wellbore, such as in conventional "wireline" logging operations. U.S. Pat. No. 4,819,214 to Gutowski et al. describes a wireline sonic logging tool using an N-th root filter to determine coherence. However, with measurements made during the drilling of the wellbore (known as "logging-while-drilling" (LWD)) conventional correlation techniques have proven less useful. One reason for these correlation techniques being less effective in LWD applications is due the violent vibration and movement the instrument sustains during the drilling operation.

Prior art methods for calculating slowness have been less than satisfactory because waveforms from successive transmitter firings detected at the same receiver have been known to vary so much in character and arrival time that stacking may result in near total loss of the true signal. A substantial cause of the waveform variation is the vibration and lateral motion/eccentering of the logging instrument, which hinders true signal detection, particularly in LWD operations.

FIG. 3 shows a flow chart of a conventional technique for calculating slowness, wherein the transmitter is repeatedly fired at 62, 66, 70 and the measured signal waveforms are stacked together at 71 by combining samples taken from the different transmitter actuations. A coherence measurement is then performed on the stacked waveforms, at 76. A coherence plot 77 (See FIG. 5A) is then obtained from the coherence measurement and the formation slowness is derived from the coherence measurement. As previously discussed, the variance between the detected waveforms can substantially alter true signal recognition. The loss of true signal character is compounded in the stacking, resulting in an unreliable slowness calculation.

There remains a need for techniques to improve the certainty and accuracy of sonic velocity determination.

SUMMARY OF INVENTION

One aspect of the invention provides a system for sonic logging of an earth formation. The system comprises a logging instrument adapted for disposal within a wellbore traversing the formation; at least one acoustic transmitter disposed on the logging instrument; at least one receiver adapted to detect acoustic signals disposed on the logging instrument; processor means adapted to process acoustic signals to determine a coherence measure from acoustic signals detected by the at least one receiver and associated with the at least one transmitter actuations; and processor means adapted to average the coherence measure for a plurality of the at least one transmitter actuations to determine a property of the formation.

One aspect of the invention provides a system for sonic logging of an earth formation. The system comprises a logging instrument adapted for disposal within a wellbore traversing the formation; at least one acoustic transmitter disposed on the logging instrument; at least one receiver adapted to detect acoustic signals disposed on the logging instrument; processor means adapted to process acoustic signals without stacking the signals to determine a coherence measure from acoustic signals detected by the at least one receiver and associated with the at least one transmitter actuations; and processor means adapted to average the coherence measure for a plurality of the at least one transmitter actuations to determine a property of the formation.

One aspect of the invention provides a method for sonic logging of an earth formation. The method comprises repeatedly actuating an acoustic transmitter on a well logging instrument disposed in a wellbore traversing the formation; detecting acoustic signals with at least one receiver disposed on the instrument; determining a coherence measure from the detected acoustic signals associated with the at least one transmitter actuations; and averaging the coherence measure for a plurality of the transmitter actuations to determine a property of the formation.

One aspect of the invention provides a method for sonic logging of an earth formation. The method comprises repeatedly actuating an acoustic transmitter on a well logging instrument disposed in a wellbore traversing the formation; detecting acoustic signals with at least one receiver disposed on the instrument; determining a coherence measure from the detected acoustic signals associated with the at least one transmitter actuations without stacking the signals; and averaging the coherence measure for a plurality of the transmitter actuations to determine the slowness of the formation.

Other aspects and advantages of the invention will be apparent from the description which follows and the accompanying drawings.

BRIEF DESCRIPTION OF DRAWINGS

FIG. 1 shows a representative sonic logging instrument that can be used with the invention.

DETAILED DESCRIPTION

Figure 2A:
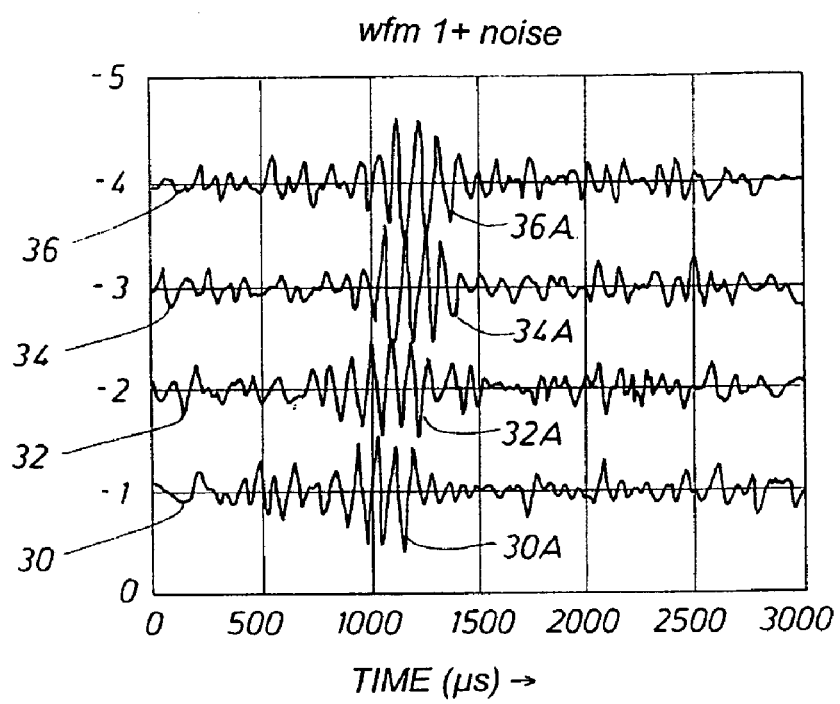
FIGS. 2A through 2D show synthesized receiver waveforms from sonic transmitter firings.
Figure 2B:
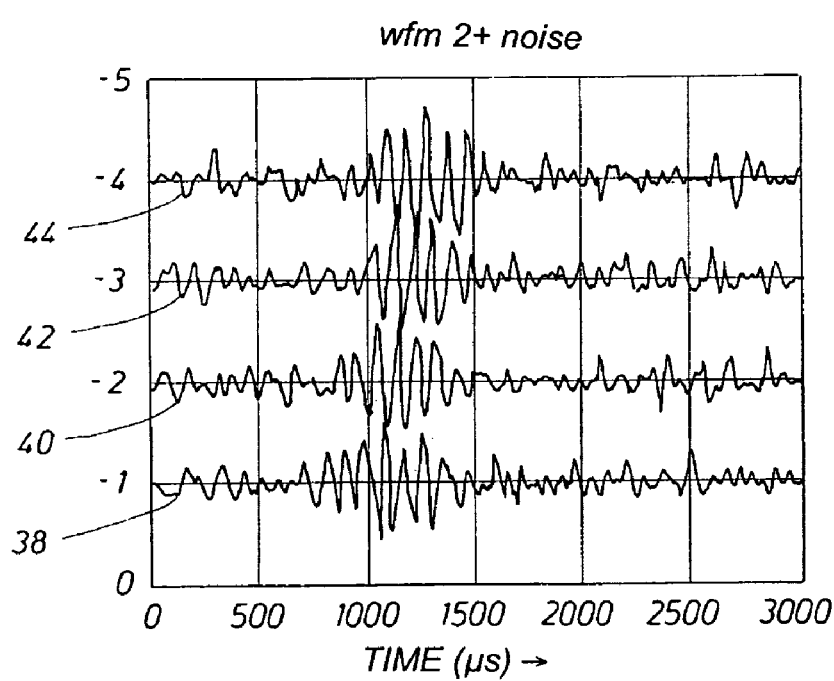
Figure 2C:
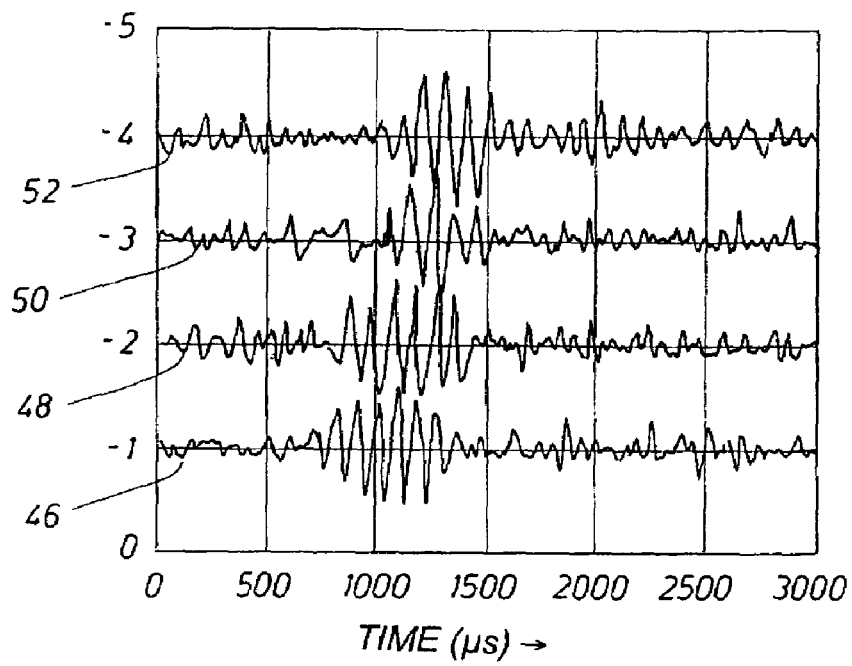
Figure 2D:
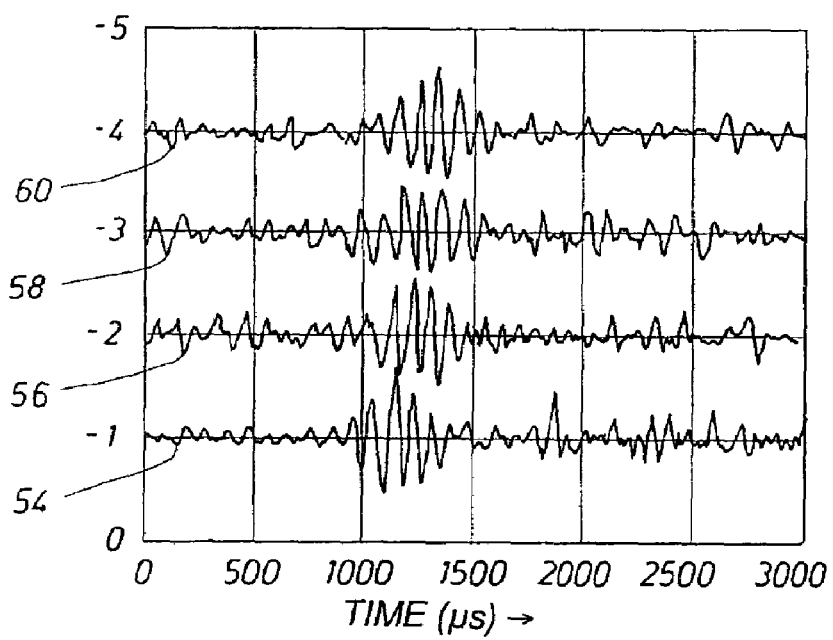
Figure 4:
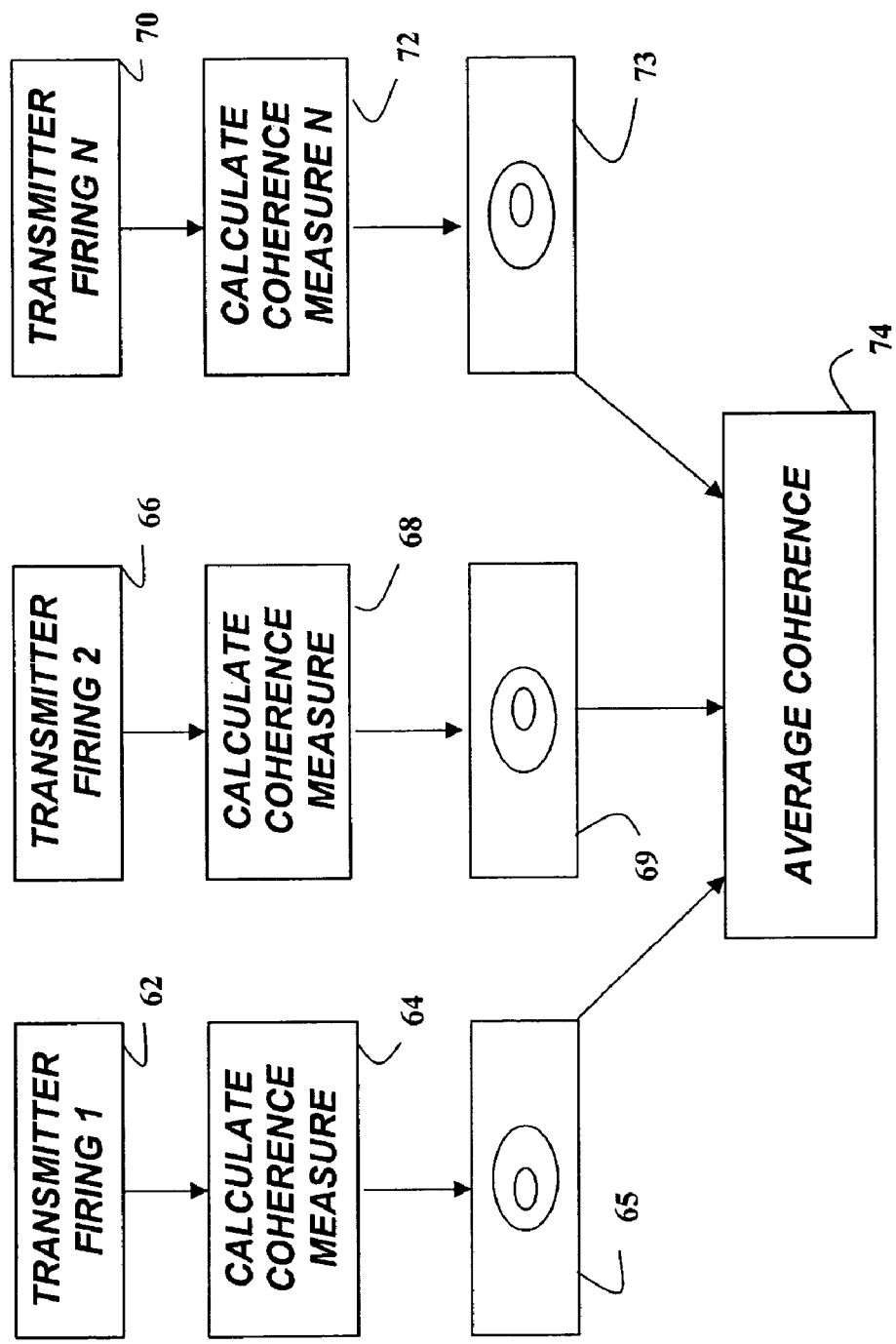
FIG. 4 shows a flow chart of an embodiment of a process according to the invention.

The present invention provides an improved technique for determining formation slowness. FIG. 4 illustrates the general process of the invention. Transmitter 1 is fired, at 62, generating waveforms such as 30–36 in FIG. 2A. These waveforms are used to calculate a coherence measure at 64 and to generate a slowness time coherence plot at 65. Similarly, for transmitter firing number 2, at 66, the resulting receiver waveforms are used to calculate a coherence measure at 68 and to generate a slowness time coherence plot at 69. This continues for a selected number of transmitter firings, N, at 70 to calculate the N-th coherence measure at 72 and to generate the N-th slowness time coherence plot at 73. The multichannel coherence measure produces N slowness time coherence plots. The multichannel coherence measure is then averaged at 74 to generate an average coherence plot (See FIG. 5B). The averaged coherence 74 is then used to determine the formation slowness using conventional techniques as known in the art, for example as described in U.S. Pat. Nos. 4,543,648, 4,594,691 and 4,543,648.

As known in the art, the sonic waveforms can be processed in digital and/or analog form. The detection of acoustic signals by the receivers 18 may take place at one time and processing of the waveform signals in accordance with the invention may be done at another time, or processing may be done while the instrument 10 is being moved and operated in the wellbore. The term acoustic waveform signals, as used herein, includes both real-time and subsequent use of signals detected by the instrument.

It will be understood that slowness time coherence is one form of calculating a multichannel coherence measure of the detected acoustic energy. Those skilled in the art will recognize that the present invention can be implemented with other methods for calculating multichannel coherence of the detected acoustic signals. Some embodiments may use coherence calculation techniques other than semblance techniques to determine velocity (not shown).

Figure 3:
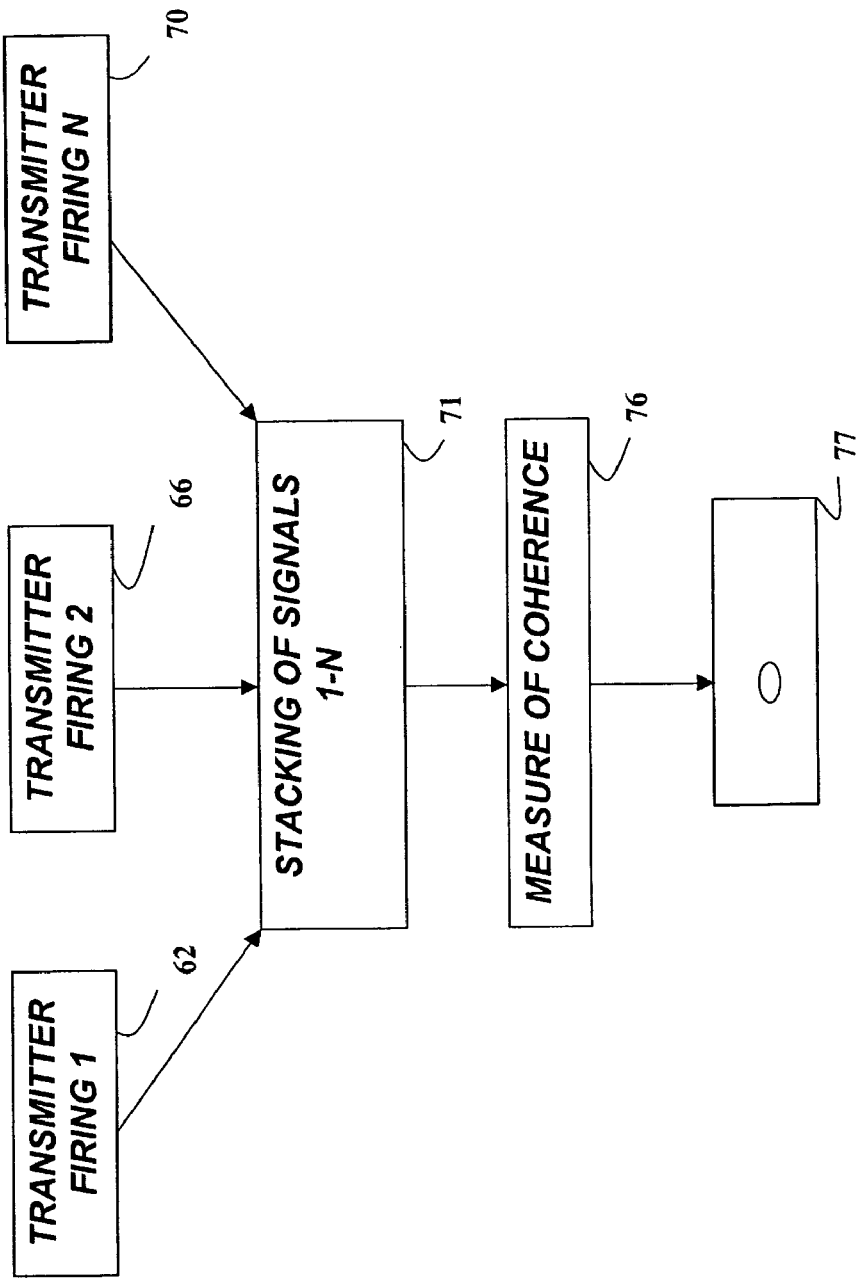
FIG. 3 shows a flow chart of a prior art technique for determining formation slowness.
Figure 5A:
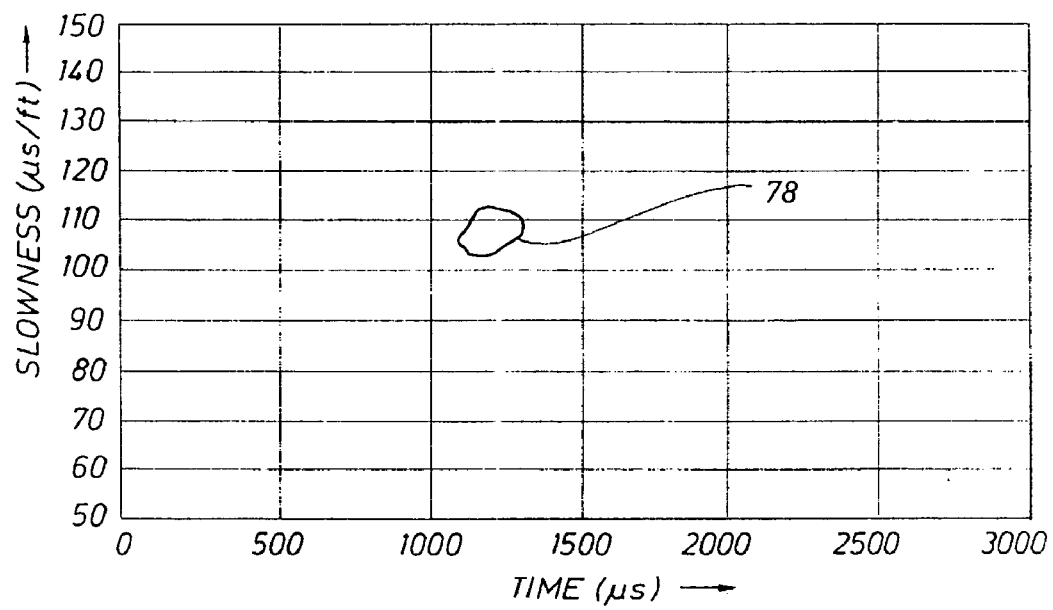
FIGS. 5A and 5B respectively show a comparison of results obtained using prior art processing and multichannel coherence measure processing according to the invention, using as signals the waveforms shown in FIGS. 2A through 2D.
Figure 5B:
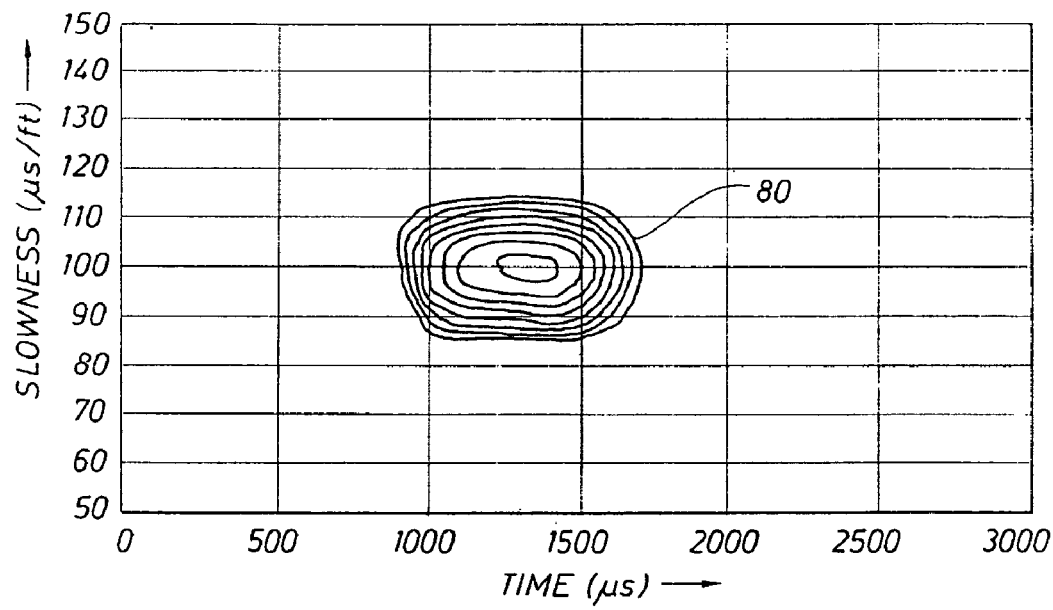

A comparison of the processing results from prior art methods with those obtained using the techniques of the invention can be observed in FIGS. 5A and 5B. FIG. 5A shows a plot of prior art STC processing using the waveforms shown in FIGS. 2A through 2D, wherein the detected waveforms are combined and stacked from successive transmitter actuations (See FIG. 3). The STC is a three dimensional plot of coherence versus arrival time and slowness. As can be observed at 78 in FIG. 5A, the coherence of the stacked waveforms is relatively low, and the calculated slowness is inaccurate.

FIG. 5B shows a coherence plot calculated using an embodiment of the invention and the waveforms shown in FIGS. 2A through 2D. Combining the coherence values from various firings in the slowness/time plane produces the averaged coherence measure. As can be observed at 80, the semblance shows a much higher coherence value resulting in a more accurate slowness calculation.

Figure 6:
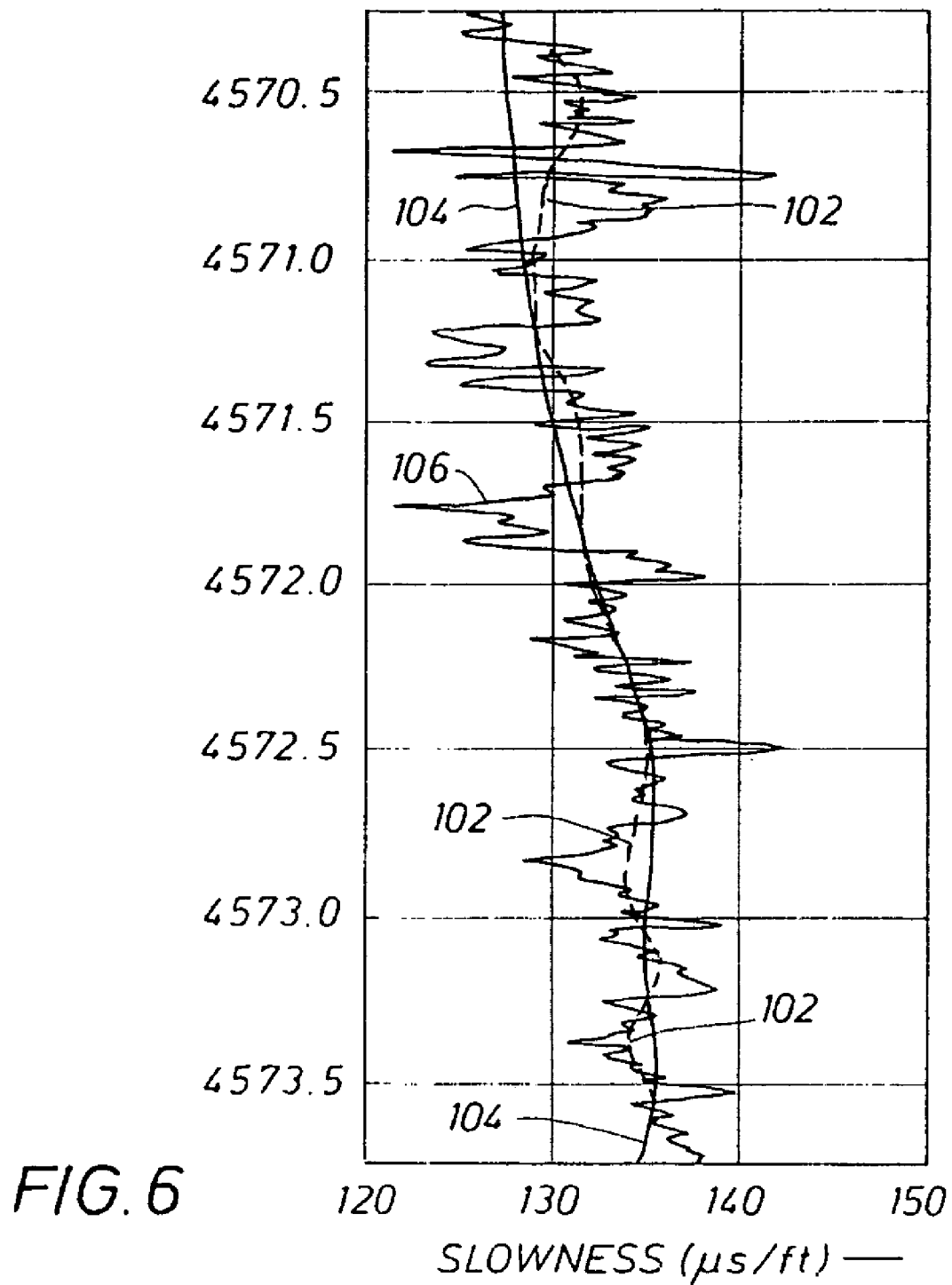
FIG. 6 shows an example of velocity calculation results obtained using an embodiment of the invention compared with results obtained using prior art methods including wireline techniques.

An example of results obtained using embodiments of the invention to determine velocity as compared with a prior art method is shown in FIG. 6. Velocity (slowness) calculation using a conventional method on data acquired using an LWD instrument is shown at curve 106. Velocity calculation using a conventional method on data acquired with a wireline-conveyed instrument is shown at curve 102. LWD sonic signal data processed according to the techniques of the invention is shown at curve 104. As can be observed in FIG. 6, the invention produces comparable to wireline-acquired data from LWD acquired data, whereas prior art methods produced noisy and/or erratic results from such data.

It will be apparent to those skilled in the art that the invention can be implemented by programming one or more suitable general-purpose computers/processors, such as the computer module(s) 21 shown in FIG. 1, to perform the techniques of the invention. Such computer modules are described in U.S. Pat. No. 5,594,706. The programming may be accomplished through the use of one or more program storage devices (memory modules in the computer module 21) readable by the processor and encoding one or more programs of instructions executable by the computer/processor for performing the operations described herein.

The program storage device may take the form of, e.g., one or more floppy disks; a CD-ROM or other optical disk; a magnetic tape; a read-only memory chip (ROM); and other forms known in the art or subsequently developed. The program of instructions may be "object code," i.e., in binary form that is executable more-or-less directly by the computer; in "source code" that requires compilation or interpretation before execution; or in some intermediate form such as partially compiled code. The precise forms of the program storage device, the encoding of instructions, and of the type of processor(s) are immaterial here.

As shown in FIG. 1, the instrument 10 can be implemented with internal computer modules 21, or the module(s) can be located on the earth surface as known in the art. Once acquired, the data may be stored and/or processed downhole or communicated to the surface in real via conventional telemetry systems known in the art. An example of "mud-pulse" telemetry techniques used in sonic LWD is described in U.S. Pat. No. 5,852,587.

Other embodiments of the invention can be devised which do not depart from the scope of the invention. For example, by the principle of reciprocity, a sonic logging instrument 10 of the invention can be configured wherein the receivers 18 are substituted by transmitters, the transmitter 16 is substituted by receivers. The instruments of the invention are equipped with conventional electronics, circuitry, and software to activate the sources and sensors to obtain the desired measurements as known in the art. It will also be appreciated that while the invention is particularly suited to LWD applications, there is no reason why the techniques of the invention cannot be applied to other logging implementations, including wireline instruments, coiled tubing conveyed measurements, logging-while-tripping, or sonic logging measurements made by any other conveyance mechanism known in the art.

For the purposes of this specification it will be clearly understood that the word "comprising" means "including but not limited to", and that the word "comprises" has a corresponding meaning.

The invention claimed is:

1. A system for sonic logging of an earth formation, comprising:
   a logging instrument adapted for disposal within a wellbore traversing the formation;
   at least one acoustic transmitter disposed on the logging instrument;
   at least one receiver adapted to detect acoustic signals disposed on the logging instrument;
   processor means adapted to process acoustic signals without stacking said signals to determine a coherence measure from acoustic signals detected by the at least one receiver and associated with the at least one transmitter actuations; and
   processor means adapted to directly average the determined coherence measure for a plurality of the at least one transmitter actuations to determine a property of the formation.

2. The system of claim 1 wherein the processor means adapted to process the acoustic signals to determine a coherence measure is adapted to calculate a slowness time coherence.

3. The system of claim 1 wherein the processor means adapted to process the acoustic signals is further adapted to produce a coherence plot from the detected acoustic signals.

4. The system of claim 1 wherein the processor means adapted to average the coherence measure is further adapted to produce an average coherence plot from the averaged coherence measure.

5. The system of claim 1 wherein the logging instrument is adapted for disposal within the wellbore during the drilling of said wellbore.

6. The system of claim 1 wherein the determined property is the slowness of the formation.

7. A method for sonic logging of an earth formation, comprising:
   (a) repeatedly actuating an acoustic transmitter on a well logging instrument disposed in a wellbore traversing the formation;
   (b) detecting acoustic signals with at least one receiver disposed on the instrument;
   (c) determining a coherence measure from the detected acoustic signals associated with the at least one transmitter actuations without stacking said signals; and
   (d) directly averaging the determined coherence measure for a plurality of the transmitter actuations to determine a property of the formation.

8. The method of claim 7 wherein the determined property is the slowness of the formation.

9. The method of claim 7 wherein step (c) includes calculating a slowness time coherence.

10. The method of claim 7 wherein step (c) includes producing a coherence plot from the detected acoustic signals.

11. The method of claim 7 wherein step (d) includes producing an average coherence plot from the averaged coherence measure.

12. The method of claim 7 wherein the logging instrument is adapted for disposal within the wellbore during the drilling of said wellbore.

* * * * *